United States Patent [19]

Tsunoda et al.

[11] Patent Number: 4,767,080
[45] Date of Patent: Aug. 30, 1988

[54] ANGLE ADJUSTMENT MECHANISM FOR FISHLINE GUIDE ROLLER OF A SPINNING REEL

[75] Inventors: Kikuo Tsunoda; Kenji Maruyama, both of Hiroshima, Japan

[73] Assignee: Ryobi, Ltd., Hiroshima, Japan

[21] Appl. No.: 87,350

[22] Filed: Aug. 20, 1987

[30] Foreign Application Priority Data

Aug. 21, 1986 [JP] Japan .................. 61-128082
Oct. 24, 1986 [JP] Japan .................. 61-164099

[51] Int. Cl.⁴ .................. A01K 89/01; G05G 5/08
[52] U.S. Cl. .................. 242/84.2 G; 74/96; 74/527
[58] Field of Search .................. 242/84.2 R, 84.2 F, 242/84.2 G, 84.21 R, 84.21 A, 84.2 A; 384/256; 254/390, 413, 414, 415; 74/96, 527, 553

[56] References Cited

U.S. PATENT DOCUMENTS

| | | | |
|---|---|---|---|
| 2,349,084 | 5/1944 | Findley | 254/415 |
| 2,704,466 | 3/1955 | Way | 74/553 X |
| 2,942,798 | 6/1960 | Alinari | 242/84.2 G |
| 3,670,984 | 6/1972 | Lemery | 242/84.2 G |
| 4,562,976 | 1/1986 | Ban | 242/84.2 G |

FOREIGN PATENT DOCUMENTS

| | | |
|---|---|---|
| 30149 | 8/1974 | Japan . |
| 89471 | 6/1982 | Japan . |
| 498460 | 1/1939 | United Kingdom .......... 242/84.2 G |

Primary Examiner—Stuart S. Levy
Assistant Examiner—Joseph J. Hail, III
Attorney, Agent, or Firm—Finnegan, Henderson, Farabow, Garrett & Dunner

[57] ABSTRACT

An angle adjustment mechanism for a fishline guide roller of a spinning wheel having a bail lever wherein the guide roller is rotatable along a first arc and may be set into selected positions along the first arc by rotation of an eccentric cam to select a particular angular position of the guide roller in the bail lever to compensate for the amount of fishline wound on the reel and the type of fishline used. The cam includes a slot for receiving stop projections arranged along a second arc around the cam to maintain the guide roller in a selected angular position in the first arc.

5 Claims, 6 Drawing Sheets

ANGLE ADJUSTMENT MECHANISM FOR FISHLINE GUIDE ROLLER OF A SPINNING REEL

FIELD OF THE INVENTION

The present device relates to an angle adjustment mechanism for a fishline guide roller of a spinning reel for fishing.

BACKGROUND OF THE INVENTION

In a conventional spinning reel, a bail lever and a bail cam are supported on each of two arms symmetrically provided in mutually opposed positions on a rotor, which is rotated by a handle. A bail is supported by the bail lever and the bail cam so that the bail can be swung back and forth. A fishline is wound on a spool while being guided by a guide roller supported by the bail lever. The guide roller is attached at an angle preset to try to prevent the fishline from becoming twisted. However, the spinning reel has a problem that the fishline is twisted due to the inaccuracy of component parts, the thickness of the fishline, and the change in the diameter of the fishline spool due to the quantity of fishline wound thereon.

Other conventional spinning reels built to avoid the above-mentioned problems were disclosed in the Japanese Utility Model Publication No. 30149/74 and the Japanese Utility Model Application (OPI) No. 89471/82 (the term "OPI" as used herein means an "unexamined published application").

In the conventional spinning reel disclosed in the Japanese Utility Model Publication No. 30149/74, the angle of a guide roller changes depending on the increase in the diameter of a spool due to the winding of a fishline on the spool. The spinning reel has a problem that since the angle of the guide roller freely changes because of the amount of wound fishline, the guide roller is likely to become unstable and to develop problems in use.

In the conventional spinning reel disclosed in the Japanese Utility Model Application (OPI) No. 89471/82, a screw is loosened to adjust the angle of a guide roller. The spinning reel has a problem that since the screw needs to be loosened and retightened, it is troublesome and time-consuming to adjust the angle of the guide roller. In addition, the spinning reel has another problem that since the guide roller and a bail are moved integrally with each other, the backward swing of the bail is likely to become improper.

OBJECTS AND SUMMARY OF THE INVENTION

An object of the present invention is an angle adjustment mechanism for a fishline guide roller which prevents twisting of the line by the guide roller.

Another object of the present invention is an angle adjustment mechanism for a fishline guide roller which automatically compensates for the amount of fishline wound on a spool.

Still another object of the present invention is an angle adjustment mechanism for a fishline guide roller which does not require the loosening and retightening of a screw to adjust the angle of the guide roller.

These and other objects are accomplished by an angle adjustment mechanism for a fishline guide roller of a spinning reel having a bail lever comprising a roller bearer means supported by the bail lever to be rotatable through an arc, a spool rotatably supported in the roller bearer and adapted to have a fishline wound thereon, means for biasing the roller bearer to be in a predetermined angular position within the arc, rotatable cam means in contact with the roller bearer means such that rotation of the cam means moves the roller bearer to a different angular position within the arc.

In another aspect, an angle adjustment mechanism according to the present invention comprises a roller bearer means supported by the bail lever to be rotatable through a first arc, a spool rotatably supported in the roller bearer means and adapted to have a fishline wound thereon, rotatable cam means in contact with the roller bearer means such that rotation of the cam means moves the roller bearer to a different angular position within the first arc, a plurality of stop projections circumferentially provided along the cam means in a second arc, and projection receiving means in the rotatable cam means for singularly receiving the stop projections such that rotation of the cam means causes the projection receiving means to receive one of the stop projections along the second arc and maintain the roller bearer means in a corresponding position along the first arc.

BRIEF DESCRIPTION OF THE DRAWINGS

The manner by which the above objects and other objects, features, and advantages of the present invention are attained will be fully apparent from the following detailed description when it is considered in view of the drawings, wherein.

DETAILED DESCRIPTION

In one embodiment, the present device provides an angle adjustment mechanism for the fishline guide roller of a spinning reel, in which roller bearers are supported by a bail lever to attach the fishline guide roller to make it possible to move the guide roller in the radial direction of a spool. An operating cam is attached to the bail lever by a cam holder so that the operating cam can be rotated in the circumferential direction thereof and moved in the axial direction thereof. One end portion of a roller shaft is located in contact with an eccentric cam surface of the operating cam so that the end portion of the roller shaft can be moved by the eccentric cam surface. The operating cam and the cam holder are provided with an engagement groove and a plurality of anti-rotating projections located in circumferential intervals, so that the engagement groove and an optional one of he anti-rotating projections can be engaged with, and disengaged, from each other. A spring urges the operating cam in such a direction that the engagement groove and optional one of the anti-rotating projections are kept engaged with each other. The angle of the fishline guide roller can be adjusted through a large number of stages by the operating cam. The fishline guide roller can thus be adjusted to an appropriate angle easily and quickly, depending on the radius of the winding of a fishline on the spool to make it less likely that the fishline will become twisted. The guide roller is maintained at the adjusted angle so that the angle of the guide roller does not become improper at the time of the forward and backward swing of the bail.

One of the roller bearers rotatably supporting the fishline guide roller is supported by the bail lever. The end portion of the roller shaft is inserted through an oval hole of a washer fitted in the bail lever, so that the fishline guide roller can be moved in the radial direction of the spool. The projecting end portion of the roller shaft is fitted in contact with the eccentric cam surface of the operating cam attached to the bail lever by the cam holder so that the operating cam can be rotated in the circumferential direction thereof and moved in the axial direction thereof. The operating cam and the cam holder are provided with the engagement groove and the plurality of anti-rotating projections located at the appropriate circumferential intervals, so that the engagement groove and optional one of the anti-rotating projections are kept engaged with each other.

Figure 1:
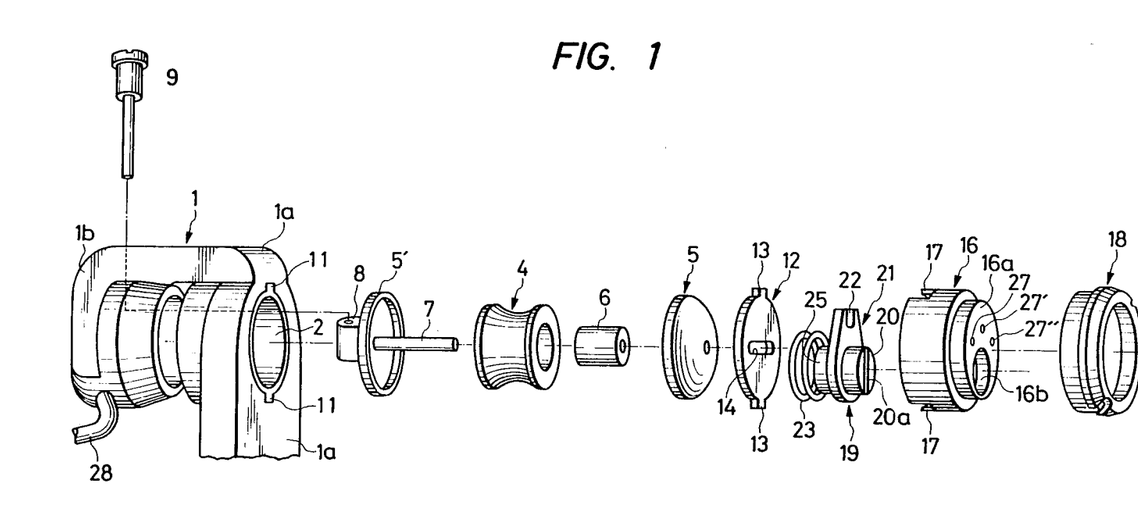
FIG. 1 is a perspective exloded view of an angle adjustment device for a fishline guide roller of a spinning reel according to the present invention.
Figure 3:
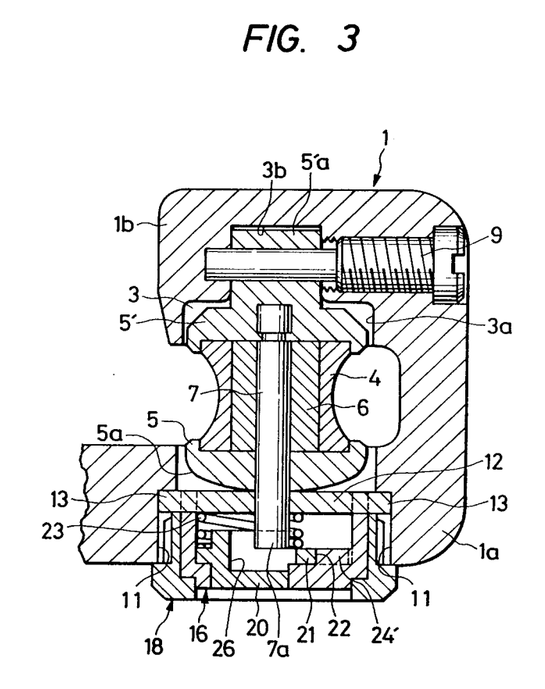
FIG. 3 is a sectional view of the view of the angle adjustment device of FIG. 2 taken along the line III—III.

As shown in FIGS. 1 and 3, the tip portion of a bail lever 1 is substantially U-shaped. An attaching hole 2 extends through the rear end part 1a of the tip portion of the bail lever 1. The front end part 1b of the tip portion of the bail lever 1 has a recess 3 opposed to the attaching hole 2 concentrically thereto and comprising an outer portion 3a of large diameter and an inner portion 3b of small diameter.

The middle portion of a fishline guide roller 4, which is supported by the bail lever 1, is constricted at a central area to receive and to the fishline. The guide roller 4 is supported with a bushing 6 by a roller shaft 7 between a pair of rollers bearers 5 and 5' so that the roller bearer can be swung perpendicularly to the axis thereof.

The other roller bearer 5' is shaped stepwise similarly to the recess 3. A projection 5'a of the roller bearer 5' is inserted in the small-diameter portion 3b of the recess 3. A screw shaft 9 is engaged in the front end part 1b of the tip portion of the bail lever 1 and extends into a through hole 8 of the projection 5'a so that the roller bearer 5 can be rotated together with the guide roller 4, about the screw shaft 9, in the radial direction of a spool 10 or rightward and leftward as to FIG. 2.

One end portion of the roller shaft 7 is secured to the roller bearer 5' or integrated therewith. The other end portion 7a of the roller shaft 7 projects from the other roller bearer 5 and is located in the attaching hole 2.

The inside surface of the outer portion of the attaching hole 2 has two grooves 11 extending in parallel with the axis of the attaching hole and facing each other. Projections 13 symmetrically extending from the peripheral portion of a washer 12 keep the washer from rotating are engaged in the grooves 11 so that the washer is centrally fitted axially with respect to the attaching hole 2. A hole 1 extends through the central portion of the washer 12 and is elongated in the radial direction of the spool 10. The projecting end portion 7a of the roller shaft 7 is slidably fitted in the hole 14 so that the direction of movement of the guide roller 4 is restricted to the radial direction of the spool 10.

The inside circumferential surface of the attaching hole 2 is provided with a threaded portion 15. A cap 18 is screw-engaged in the portion 15 so that the cap is secured in the attaching hole 2. A cam holder 16 is fixedly supported in the attaching hole 2 by the cap 18 in such a manner that the projections 13 of the washer 12 are engaged in grooves 17 provided in the inside circumferential surface of the cam holder and facing each other.

An eccentric hole 16b extends through the top portion 16a of the cam holder 16. The projection 20 of an operating cam 19 is fitted in the eccentric hole 16b from the inside. The operating cam 19 is thus supported in the cam holder 16 so that the operating cam can be rotated in the circumferential direction thereof and slid in the axial direction thereof and will not come off axially.

A cam plate 21 projects from the operating cam 19 in the radial direction thereof and has an engagement groove 22 at the end of the cam plate. A compressed spring 23 supported at the ends thereof on the cam plate 21 and the washer 12 urges the operating cam 19 outward in the axial direction thereof to place the cam plate in pressure contact with the top portion 16a of the cam holder 16.

A plurality of anti-rotating projections 24, 24', and 24" are provided at appropriate circumferential intervals on the inside surface of the top portion 16a of the cam holder 16 so that one of the anti-rotating projections can be engaged in the engagement groove 22. Alternatively the cam holder 16 and the cam plate 21 may have one engagement groove 22 and several anti-rotating projections 24, or a plurality of engagement grooves 22 and a single anti-rotating projection 24.

A cylindrical portion 25 projects from the inner end of the operating cam 19 in the axial direction thereof symmetrically to the projection 20. The inside circumferential surface of the cylindrical portion 25 functions as an eccentric cam surface 26 with which the projecting end portion 7a of the roller shaft 7 is located in contact.

The operating cam 19 can be optionally rotated to move the roller shaft 7 in the oval hole 14 to turn the guide roller 4 in the radial direction of the spool 10. The surface of the projection 20 of the operating cam 19 has a groove 20a that extends in a direction that is coincident with that of the engagement groove 22 when the directions are seen in the axial direction of the operating cam. The tip of a screwdriver can be inserted into the groove 20a.

The surface of the top portion 16a of the cam holder 16 is provided with graduation marks 27, 27' and 27" corresponding to the anti-rotating projections 24, 24" and 24". The groove 20a of the operating cam 19 may be rotated to a position coincident with one of the graduation marks 27, 27' and 27" to easily adjust the angle of the guide roller 4 to a desired value in the radial direction of the spool 10 by eyesight. Element 28 in FIG. 1 is a bail.

Figure 5:
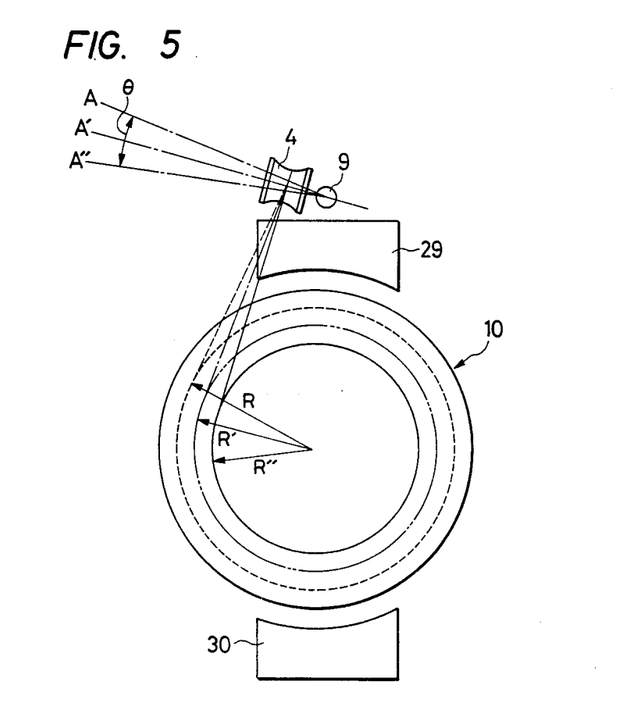
FIG. 5 is a schematic diagram illustrating the operation of the angle adjustment device of the present invention.

In FIG. 5, arms 29 and 30 are symmetrically projecting from the peripheral portion of a rotor not shown in the drawings. The bail lever 1 and a bail cam are pivotally coupled to each of the arms 29 and 30 by a stepped screw or the like. The bail 28 is then attached to the rotor so that the bail can be swung back and forth.

The angle of the guide roller 4 is adjusted depending on the change in the wound quantity of a fishline on the spool 10 or depending on the type of line.

Figure 4:
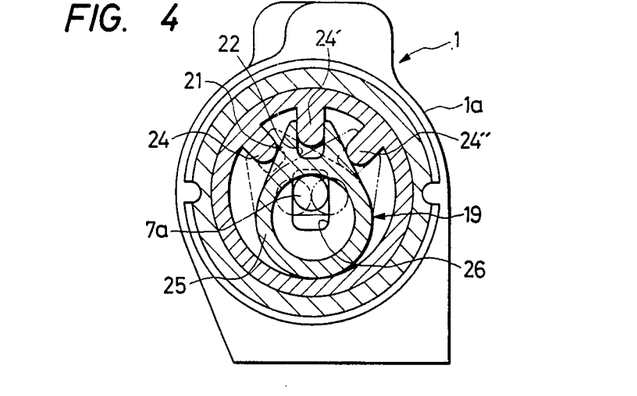
FIG. 4 is a sectional view of the view of the angle adjustment device of FIG. 2 taken along the line IV—IV.

When the engagement groove 22 of the operating cam 19 is engaged with the anti-rotating projection 24' as shown by full lines in FIG. 4, the roller shaft 7 is maintained in a neutral position by the cam surface 26 so that the guide roller 4 is kept in a neutral position within the range $\theta$ (shown in FIG. 5) of operation of the guide roller.

When the tip of a screwdriver is inserted into the groove 20a of the operating cam 19 to push the cam inward in the axial direction thereof against the force of the spring 23 when the guide roller 4 is in the neutral position, the engagement groove 22 is disengaged from the anti-rotating projection 24'. The screwdriver may then be turned clockwise or counterclockwise as to FIG. 4 to rotate the operating cam 19 in the same direction as the turning of the screwdriver to move the projecting end portion 7a of the roller shaft 7 by the eccentric cam surface 26 of the operating cam rightward or leftward (as to FIG. 4) in the hole 14 of the washer 12. As a result, the guide roller 4 is rotated together with the roller bearers 5 and 5" left or right about the screw shaft 9. The screwdriver is thereafter pulled out of the groove 20a of the operating cam 19 so that the operating cam is pushed outward to the original position thereof by the spring 23 and the engagement groove 22 of the operating cam is kept engaged with the anti-rotating projection 24". The guide roller 4 is thus adjusted to an angle shown by a two-dot chain line in FIG. 2 in other words, the angle of the guide roller 4 is adjusted from A' to A" shown in FIG. 5.

Figure 2:
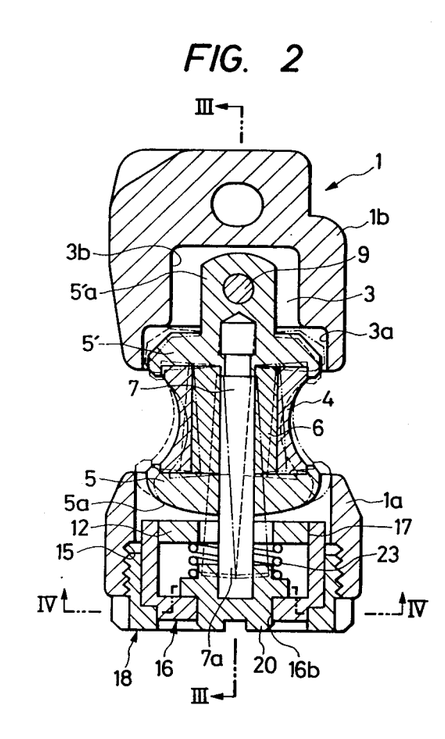
FIG. 2 is a longitudinal cross-section of the angle adjustment device of FIG. 1.

When the operating cam 19 is pushed inward and rotated counterclockwise and the inward pushing of the operating cam is then discontinued so that the engagement groove 22 is engaged with the anti-rotating projection 24, the guide roller 4 is maintained in a position shown by a dotted line in FIG. 2. The angle of the guide roller 4 is thus adjusted from A' to A shown in FIG. 5.

As shown in FIG. 5, the angle of the guide roller 4 is adjusted to A for the radius R' thereof or A" for the radius R" thereof. As a result, the angle of the winding motion of the fishline to the spool is kept constant even if the radius of the winding of the fishline on the spool changes to R, R' or R"

According to the present device, a roller bearer 5" is supported by a screw shaft 9 at the front end part 1b of the tip portion of a bail lever 1 to attach a guide roller 4 to make it possible to turn the guide roller in the radial direction of a spool 10. The projecting end portion 7a of a roller shaft 7 is moved by the eccentric cam surface 26 of an operating cam 19 rotatably attached to the rear end part 1a of the tip portion of the bail lever 1 to adjust the angle of the guide roller depending on the radius R, R', or R" or the like of the winding of a fishline on the spool 10. The guide roller 4 can be adjusted to an appropriate angle depending on the change in the wound quantity of the fishline on the spool 10 to keep the angle of the winding motion of the fishline to the spool 10 at an ideal value to make it less likely for the fishline to be twisted. Since the angle of the guide roller 4 can be ajdusted independently of a bail 28, the backward swing of the bail is not made improper even if the angle of the guide roller is arbitrarily adjusted. Since an interposed spring 23 resiliently urges an operating cam 29 toward a cam holder 16 so that an engagement groove 22 and one of the anti-rotating projections 24, 24' and 24" are kept engaged with each other without playing or loosening, the guide roller 4 is maintained at the adjusted angle so that the angle of the guide roller does not become improper. The operating cam 19 can be easily pushed and rotated by a screwdriver or the like to adjust the angle of the guide roller 4 to a large number of stages in a simple, accurate and quick manner.

In a second embodiment of the present invention, an angle adjustment mechanism for the fishline guide roller of a spinning reel includes a roller bearer supported by a screw shaft to a bail lever to attach a guide roller to make it possible to turn the guide roller in the radial direction of a spool. An adjusting cam is rotatably attached to a front end part of the tip portion of the bail lever, and the adjusting cam is rotated to move one end of a shaft for the guide roller through the action of an eccentric cam surface of the adjusting cam to adjust the angle of the guide roller. With the angle adjustment mechanism, a fishline, which is wound and unwound by the spinning reel, is less likely to be twisted. The angle of the guide roller can be adjusted easily, quickly and independently in a stepless manner depending on the diameter of the winding of the fishline on the spool, and the guide roller can be stably maintained at the adjusted angle to make it possible to smoothly swing a bail back and forth.

The roller bearer, which supports the guide roller through the action of the shaft so that the guide roller can be rotated in the circumferential direction thereof, is supported by the bail lever to attach the guide roller to make it possible to turn the guide roller in the radial direction of the spool. The adjusting cam is rotatably attached to the front end part of the tip portion of the bail lever which supports the shaft so that the shaft can be moved in the same direction as the turning of the guide roller. The shaft is located in resilient contact with the cam surface of the adjusting cam by a spring so that the shaft can be moved through the action of the eccentric cam surface of the adjusting cam to adjust the angle of the guide roller.

Figure 6:
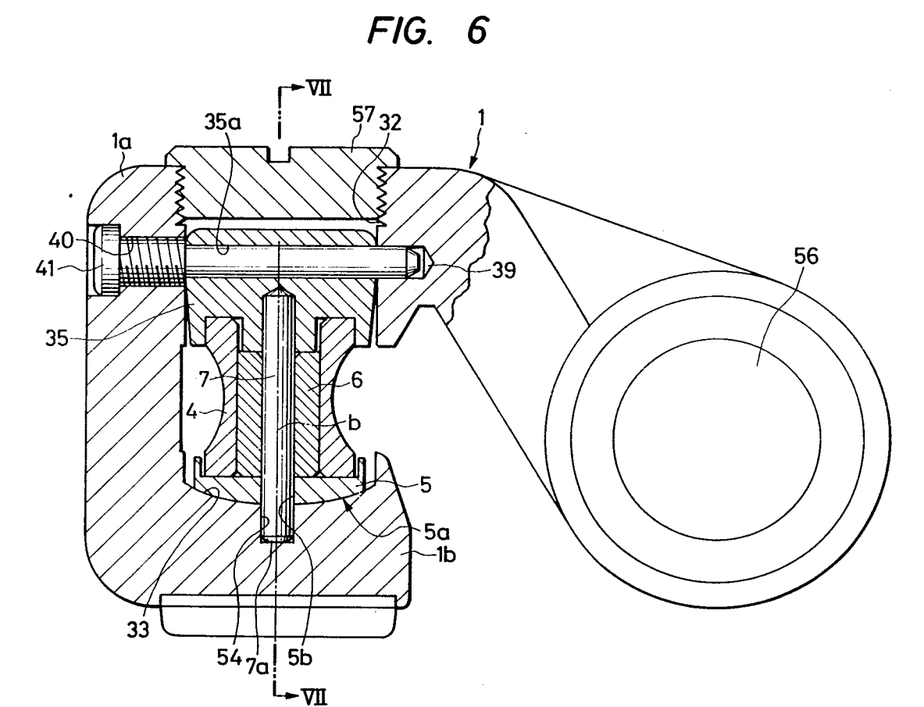
FIG. 6 is a partial sectional view of an other embodiment of the angle adjustment device for a fishline guide roller of a spinning reel according to the present invention.
Figure 7:
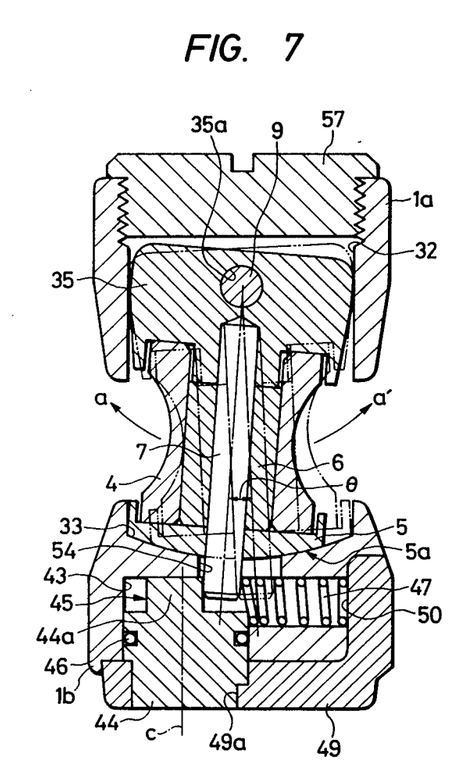
FIG. 7 is a sectional view of the device of FIG. 6 taken along line VII—VII.
Figure 8:
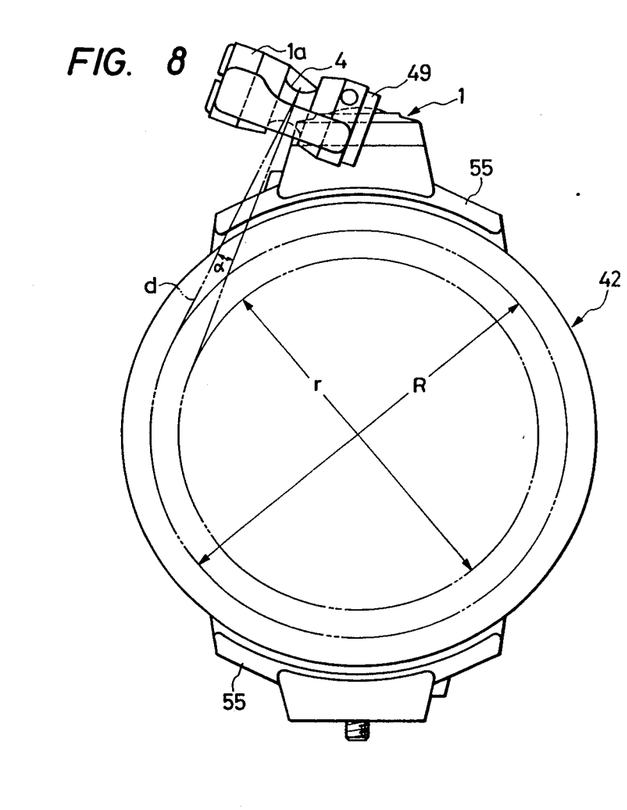
FIG. 8 is a front view of the device of FIG. 6, showing the relation between the angle of a guide roller and the diameter of the wound portion of a fishline on the spool of a spinning reel.
Figure 9:
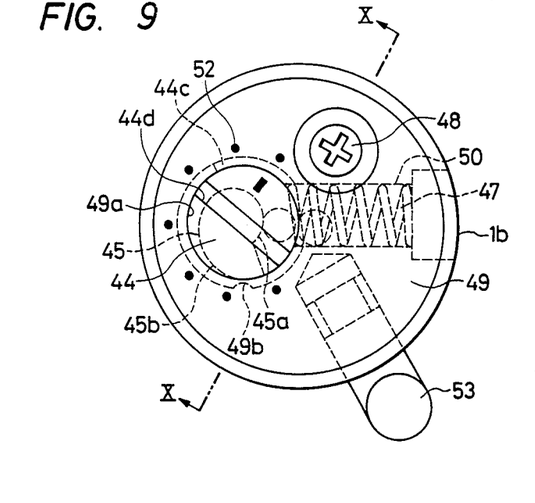
FIG. 9 is a bottom view of a reel including the angle adjustment mechanism of the present invention.
Figure 10:
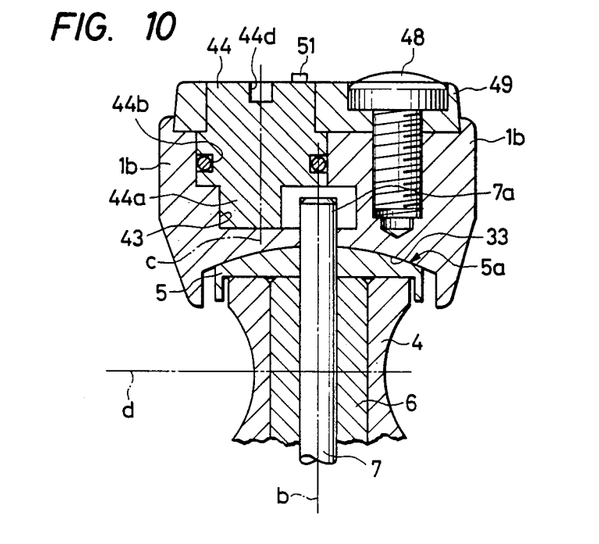
FIG. 10 is a sectional view of FIG. 9 taken along the line X—X.

As shown in FIG. 6, the tip portion of a bail leverl 1 is substantially U-shaped so that the rear end part 1a and front end part 1b of the tip portion are opposed to each other. An attaching hole 32 extends through the rear end part 1a. A spherically concave support seat 33 is provided on the inside surface of the front end part 1b concentrically to the attaching hole 32.

The middle portion of a guide roller 4 is constricted so that a fishline is conveniently guided on the roller. The guide roller 4 is supported with a bushing 6 on a shaft 7 so that the guide roller 4 can be rotated in the circumferential direction thereof. The butt portion of the shaft 7 is press-fitted in a roller bearer 35 fitted in the attaching hole 2 so that the roller bearer can be turned in a direction mentioned hereinafter. The guide roller 4 is interposed between the roller bearer 35 and another roller bearer 5 supported on the tip portion of the shaft 7. The inside surface 5a of the roller bearer 5 is spherically shaped to correspond to the spherically concave support seat 33.

A hole 39 and a tapped hole 40 are coaxially provided in the rear end part 1a of the tip portion of the bail lever 1. A screw shaft 41 is fitted in the holes 39 and 40 and extends through the hole 35a of the roller bearer 35 to support the roller bearer in the attaching hole 32 and support the guide roller 4 by the bail lever 1 so that the guide roller can be turned about the screw shaft 41 in the radial direction of a spool 42 as shown by arrows (a) and (a') in FIG. 2. When the roller bearer 35 is turned at the time of the turning of the guide roller 4, the spherical surface of the other roller bearer 5 slides on that of the support seat 33 so that the distance between the roller bearer and the bail lever 1 does not change.

The tip portion 7a of the shaft 7 extends by a desired length outward from the hole 5b of the roller bearer 5 and is fitted in a oval-shaped hole 54 provided in the front end part 1b of the tip portion of the bail lever 1 and extending as a narrow element in the same direction as the turning of the guide roller 4, so that the tip portion 7a can slide without play.

The front end part 1b of the tip portion of the bail lever 1 has a recess 43 whose inner end communicates with the hole 54. An adjusting cam 44 is fitted in the recess 43 so that the adjusting cam can be rotated around its axis (c) parallel with the axis (b) of the shaft 7. The peripheral surface of a projection 44a extending from the inner end of the adjusting cam 44 has an eccentric cam surface 45 which is curved so that the radius thereof from the axis (c) of the adjusting cam 44 increases gradually from the minimum at the low portion 45a to the maximum at the high portion 45b thereof.

An O-ring 46 is fitted in the circumferential grove 44b of the adjusting cam 44. The cam 44 is then fitted in the recess 43 so that the cam does not play nor loosen. A stopper projection 44c is provided on a part of the outside circumferential surface of the adjusting cam 44 and is engaged with projections 49b provided over a prescribed ranqe of angle on the inside circumferential surface of the through hole 49a of a cover 49, so that the stopper projection can be slid in the circumferential direction of the adjusting cam. As a result, the adjusting cam 44 can be rotated only within a prescribed arc or range of angle.

The tip portion 7a of the shaft 7 extends into the recess 43 and is located in resilient contact with the cam surface 45 by a spring 47 so that the shaft is moved into a direction (a) or (a') by the rotation of the adjusting cam 44 through the action of the cam surface 45.

The adjusting cam 44 is fitted in the through hole 49a of the cover 49 secured to the front end part 1b of the tip portion of the bail lever 1 by a screw 48, so that the adjusting cam does not come off and a tool such as a screwdriver can be inserted into the groove 44d of the end face of the adjusting cam to rotate the cam by operation from outside.

The spring 47 is provided in the transverse hole 56 of the front end part 1b of the tip portion of the bail lever 1 and supported by the cover 49 so that the spring does not come off.

An indicator 51 such as a projection is provided on the outer end face of the adjusting cam 44 and a graduation 52 or the like is provided around the through hole 49a of the cover 49 so that the indicator 51 can be set at the graduation 52 or the like to easily adjust the angle of the guide roller 4 to a desired value by eyesight.

One end of a bail 53 is secured to the front end part 1b of the tip portion of the bail lever 1. The butt portion of the bail lever 1 is pivotally coupled to the arm 45 of a rotor by a stepped screw 56 or the like so that the bail lever can be swung back and forth.

The tip portion 7a of the shaft 7 is located in resilient contact with the low portion of the cam surface 45 of the adjusting cam 44 by the spring 47, the guide roller 4 is kept inclined in the direction (a) as shown by a full line in FIG. 2. when the adjusting cam 44 is then rotated clockwise (as to FIG. 4), the cam surface 45 is rotated in the direction from the low portion 45a thereof to the high portion 45b thereof to push and move the tip portion 7a of the shaft 7 rightward (as to FIG. 2) against the force of the spring 47 to turn the roller bearer 35 in the direction (a') about the screw shaft 41. As a result, the guide roller 4 is inclined to the maximum angle in the direction (a') as shown by a two-dot chain line in FIG. 2, as the tip portion 7a of the shaft 7 is located on the high portion 45b of the cam surface 45. For that reason, the guide roller 4 can be adjusted to a desired angle within an adjustment range θ by optionally rotating the adjusting cam 44 forward or backward.

FIG. 3 shows that the fishline (d) is displaced by an angle depending on the change in the diameter R or r of the winding of the fishline on the spool 42.

According to the present device, a roller bearer 35 is supported by a screw shaft 41 to the rear end part 1a of the tip portion of a bail lever 1 to attach a guide roller 4 to make it possible to turn the guide roller in the radial direction of a spool 42. An adjusting cam 44 is attached to the front end part 1b of the tip portion of the bail lever 1 to move a shaft 7 to optionally adjust the angle of the guide roller 4. As a result, a fishline, which is wound and unwound by a spinning reel, is made less likely to be twisted. Besides, the angle of the guide roller 4 can be adjusted depending on the diameter of the winding of the fishline on the spool of the reel, independently of a bail. For that reason, even if the angle of the guide roller 4 is arbitrarily adjusted, the backward swing of the bail is prevented from becoming improper.

The shaft 7 for the guide roller 4 is maintained in resilient contact with the cam surface 45 of the adjusting cam 44 by an interposed spring 47 so that the shaft does not play. The guide roller 4 is stably kept at the adjusted angle. As a result, no trouble is caused. The angle of the guide roller 4 can be simply and quickly adjusted by only rotating the adjusting cam 44.

What is claimed is:

1. An angle adjustment mechanism for a fishline guide roller of a spinning reel having a bail lever comprising:
   a roller bearer means pivotally supported by the bail lever to be rotatable through a first arc;
   a roller rotatably supported in said roller bearer means and adapted to have a fishline guided thereby;
   rotatable cam means in contact with said roller bearer means such that rotation of said cam means moves said roller bearer to a different angular position within said first arc;
   a plurality of stop projections circumferentially provided along said cam means in a second arc; and
   projection receiving means in said rotatable cam means for singularly receiving said stop projections such that rotation of said cam means causes said projection receiving means to receive one of said stop projections along said second arc and maintain said roller bearer means in a corresponding position along said first arc.

2. An angle adjustment mechanism according to claim 1, wherein said rotatable cam means includes an eccentric cam surface and said roller bearer means includes a roller shaft for rotatably supporting said roller, said roller shaft having a first end pivotally mounted to the bail lever and a second end in contact with said cam surface.

3. An angle adjustment mechanism according to claim 2, wherein said projection receiving means comprise a slot in said cam surface.

4. An angle adjustment mechanism according to claim 3, further including a spring for urging the engagement of one of said stop projections and said slot.

5. An angle adjustment mechanism according to claim 1, further including means for visibly indicating the position of said roller bearer means along said first arc.

* * * * *